(12) United States Patent
Hewson et al.

(10) Patent No.: US 8,898,431 B2
(45) Date of Patent: Nov. 25, 2014

(54) MULTI-PATH NETWORK

(75) Inventors: David Charles Hewson, Bristol (GB); Jon Beecroft, Bristol (GB); Anthony Michael Ford, Bristol (GB); Edward James Turner, Bristol (GB); Mark Owen Homewood, Somerset (GB)

(73) Assignee: Cray HK Limited, Reading (GB)

( * ) Notice: Subject to any disclaimer, the term of this patent is extended or adjusted under 35 U.S.C. 154(b) by 744 days.

(21) Appl. No.: 13/055,408

(22) PCT Filed: Jul. 23, 2009

(86) PCT No.: PCT/GB2009/001825
§ 371 (c)(1),
(2), (4) Date: Jan. 21, 2011

(87) PCT Pub. No.: WO2010/010351
PCT Pub. Date: Jan. 28, 2010

(65) Prior Publication Data
US 2011/0134924 A1    Jun. 9, 2011

(30) Foreign Application Priority Data

Jul. 25, 2008   (GB) .................................. 0813630.1

(51) Int. Cl.
*G06F 9/26* (2006.01)
*H04L 12/741* (2013.01)
*H04L 12/701* (2013.01)
*H04L 12/721* (2013.01)
*H04L 12/46* (2006.01)

(52) U.S. Cl.
CPC ................ *H04L 45/00* (2013.01); *H04L 45/54* (2013.01); *H04L 45/745* (2013.01); *H04L 45/66* (2013.01); *H04L 12/4625* (2013.01); *H04L 45/44* (2013.01)
USPC ......................................... 711/216; 711/122

(58) Field of Classification Search
USPC ................ 370/241, 254, 360, 392, 393, 394, 370/395.53, 400, 401; 711/108, 122, 118, 711/135, 141, 206, 216
See application file for complete search history.

(56) References Cited

U.S. PATENT DOCUMENTS

| 5,524,001 A | * | 6/1996 | Beaudry et al. ............... 370/394 |
| 6,078,963 A | * | 6/2000 | Civanlar et al. ............... 709/238 |

(Continued)

FOREIGN PATENT DOCUMENTS

| CN | 1567237 A | 1/2005 |
| EP | 1758320 A1 | 2/2007 |
| WO | WO-2008/052341 A1 | 5/2008 |

OTHER PUBLICATIONS

Chord—A Scalable Peer-to-peer Lookup Service for Internet Applications.

(Continued)

*Primary Examiner* — Hassan Phillips
*Assistant Examiner* — Ajay Cattungal
(74) *Attorney, Agent, or Firm* — Craig J. Lervick; Larkin Hoffman Daly & Lindgren, Ltd.

(57) ABSTRACT

The present invention provides a multi-path network for use in a bridge, switch, router, hub or the like, comprising a plurality of network ports adapted for connection with one or more devices, each device having a different identifying address data; a plurality of network elements; and a plurality of network links interconnecting the network elements and connecting the network elements to the network ports, wherein the multi-path network further comprises separately addressable memory elements each adapted for storing device address data and the multi-path network is adapted to distribute a plurality of device address data amongst the plurality of memory elements.

46 Claims, 5 Drawing Sheets

(56) References Cited

U.S. PATENT DOCUMENTS

| | | | |
|---|---|---|---|
| 6,141,344 A * | 10/2000 | DeLong | 370/360 |
| 6,275,919 B1 * | 8/2001 | Johnson | 711/216 |
| 6,310,874 B1 | 10/2001 | Miller et al. | |
| 8,194,668 B2 * | 6/2012 | Friskney et al. | 370/392 |
| 8,468,297 B2 * | 6/2013 | Bhattacharya | 711/108 |
| 2004/0052257 A1 * | 3/2004 | Abdo et al. | 370/392 |
| 2004/0139274 A1 * | 7/2004 | Hui | 711/108 |
| 2004/0176864 A1 * | 9/2004 | Cocco et al. | 700/108 |
| 2006/0212653 A1 * | 9/2006 | Alexander et al. | 711/122 |
| 2006/0253606 A1 * | 11/2006 | Okuno | 709/238 |
| 2006/0268739 A1 * | 11/2006 | Garcia et al. | 370/254 |
| 2007/0286085 A1 * | 12/2007 | Rabinovitch | 370/241 |
| 2008/0104333 A1 * | 5/2008 | Veazey | 711/141 |
| 2010/0023684 A1 * | 1/2010 | Chai et al. | 711/108 |
| 2010/0091685 A1 * | 4/2010 | Agrawal et al. | 370/254 |

OTHER PUBLICATIONS

International Search Report; mailed Oct. 19, 2009; Authorized Officer: Athanasios Mariggis.

* cited by examiner

MULTI-PATH NETWORK

BACKGROUND

Technical Field of the Invention

The present invention generally relates to a multi-path network and a method of operation, and in particular to a multi-path network which has a scalable network address look-up table. The multi-path network and method are suitable for use in, but not limited to, multi-processor networks such as storage networks, data centres and high performance computing. In particular, the present invention is suited for use in bridges, switches, routers, hubs and similar devices including Ethernet devices adapted for the distribution of standard IEEE 802 data frames or data frames meeting future Ethernet standards.

Protocol Layers

Conceptually, an Ethernet network is decomposed into a number of virtual layers in order to separate functionality. The most common and formally standardised model used is the Open Systems Interconnect (OSI) reference model. A useful article that describes in detail the OSI reference model is "OSI Reference Model—The ISO Model of Architecture for Open Systems Interconnection" by Hubert Zimmermann, IEEE Transactions on Communications, Vol. COM-28, No. 4, April 1980. The OSI reference model comprises seven layers of network system functionality, as follows:
 1. Physical Layer is responsible for physical channel access. It consists of those elements involved in transmission and reception of signals, typically line drivers and receivers, signal encoders/decoders and clocks.
 2. Data Link Layer provides services allowing direct communication between end-station devices over the underlying physical medium. This layer provides Framing, separating the device messages into discrete transmissions or frames for the physical layer, encapsulating the higher layer packet protocols. It provides Addressing to identify source and destination devices. It provides Error Detection to ensure that corrupted data is not propagated to higher layers.
 3. Network Layer is responsible for network-wide communication, routing packets over the network between end-stations. It must accommodate multiple Data Link technologies and topologies using a variety of protocols, the most common being the Internet Protocol (IP).
 4. Transport Layer is responsible for end-to-end communication, shielding the upper layers from issues caused during transmission, such as dropped data, errors and mis-ordering caused by the underlying medium. This layer provides the application with an error-free, sequenced, guaranteed delivery message service, managing the process to process data delivery between end stations. Transmission Control Protocol (TCP) and User Datagram Protocol (UDP) are the most commonly recognised Transport Layer protocols.
 5. Session Layer is responsible for establishing communications sessions between applications, dealing with authentication and access control.
 6. Presentation Layer ensures that different data representations used by machines are resolved.
 7. Application Layer provides generic functions that allow user applications to communicate over the network.

For the purposes of this document we need not consider operations above the Transport Layer as the method described herein should, if well implemented, shield higher layers from issues arising in and below its scope.

Network Interconnections

A device that implements network services at the Data Link Layer and above is called a station. The Physical Layer is excluded from this definition as it is not addressable by a protocol. There are two types of station:
 1. End Stations are the ultimate source and destination of network data communication across the network.
 2. Intermediate Stations forward network data generated by end stations between source and destination.

An intermediate station which forwards completely at the Data Link Layer is commonly called a Bridge; a station which forwards at the Network Layer is commonly called a Router.

Network stations attached to an Ethernet network exchange data in short sequences of bytes called packets or Protocol Data Units (PDU). PDUs consist of a header describing the PDUs destination and a body containing the payload data. In the OSI model the PDU has a distinct name at each protocol layer. A Physical Layer PDU is called a stream, at the Data Link Layer the PDU is a frame, at the Network Layer the PDU is a packet and at the Transport Layer the PDU is called a segment or message.

PDUs are encapsulated before being transmitted over the physical Ethernet hardware. Each encapsulation contains information for a particular OSI Layer, the Ethernet stream encapsulates a frame which in turn encapsulates a packet which encapsulates a message and so on. This encapsulation, containing headers and payload, is finally transmitted over the network fabric and routed to the destination.

At the Transport Layer, an associated standard, the Transmission Control Protocol (TCP), in addition to providing a simplified interface to applications by hiding the underlying PDU structure, is responsible for rearranging out-of-order PDUs and retransmitting lost data. TCP has been devised to be a reliable data stream delivery service; as such it is optimised for accurate data delivery rather than performance. TCP can often suffer from relatively long delays while waiting for out-of-order PDUs and data retransmission in extreme cases, reducing overall application performance and making it unsuitable for use where a maximum PDU transmission delay (jitter) needs to be guaranteed, in-file systems or media delivery, for example.

Furthermore, at the lowest layer of the TCP/IP hierarchy, in the network access layer where PDUs are transmitted over the network, a fully compliant IEEE 802.1 D standard Media Access Control (MAC) bridge joining separate networks together requires that order is preserved for source and destination pairs.

PDU duplication is another cause of reduced performance in Ethernet networks. A unicast PDU whose destination route has not been learned by a network bridge will be flooded out to all routes from the bridge and will be buffered on multiple outbound ports at the same time. Network reconfiguration affecting the preferred route from a bridge to the destination can cause a duplicate PDU to be sent from a buffer after a duplicate PDU has already been sent out of the previous preferred route, both arriving at the destination. Again, the higher level TCP protocol will handle this but not without degrading overall performance.

Disordering and duplication should not occur during normal operation. These features of multi-path Ethernet networks are constrained by the Rapid Spanning Tree Protocol (RSTP) as defined by the IEEE 802.1D standard. The RSTP maintains a preferred route between bridges by disabling alternative routes, removing multiple paths and loops, leaving a single path that ensures in-order frame delivery.

On entry to an intermediate station, such as an Ethernet bridge or router, the destination address information, carried in frame header data, is used to pick an egress port through which the data will take its next hop towards the destination.

The choice of port for a destination address is held in a network address look-up table. This table is populated by the intermediate station once the route has been discovered and is subsequently used by all other communications to identify a route to a particular destination.

The type of information held in the network address look-up table of the intermediate stations may vary depending upon the supported Ethernet protocol but the discovery process and the table's subsequent use is common to both Ethernet Data Link Layer Bridges and Network Layer Routers. The following description uses a Data Link Layer Bridge as the context to illustrate the principle but the method extends to Network Layer Routers and other uses of look-up tables outside these protocols and address mappings. The addressing scheme used within a Bridge is based upon a Media Access Control (MAC) identity code which is a unique identifier embedded into every Ethernet device at production. The MAC addresses of the source and destination end stations are encapsulated within the frames of the Data Link Layer.

An IEEE 802 standard MAC address is a 48 bit number. An intermediate station's MAC address look-up table is used to store these addresses and enables a translation of an address to a physical route. It is usually constructed from a Content Addressable Memory (CAM) or some other form of caching mechanism.

When an Ethernet frame arrives at a Bridge ingress port, the source MAC address (i.e. the MAC address of the originating device that output the Ethernet frame) is saved in the MAC address look-up table against the link on which the frame entered the switch. The entry in the MAC address look-up table identifies the link as the one to use for frames whose destination is the originating device in subsequent communications. The Ethernet frame includes in its header a destination MAC address and a table look-up is performed using the destination MAC address to determine on which link the frame is to forwarded out of the Bridge. If the destination MAC address is in the table a port number will be returned to route the frame for the next hop to its destination. The table look-up will fail if the destination MAC address port mapping is unknown and has no entry in the table. Where the table look-up has failed, the frame is flooded to a selection of the other ports on the Bridge, normally all ports but the ingress port. The assumption is that the frame will eventually find another Ethernet Bridge with knowledge of where to route this frame for the destination MAC address or it will arrive at the destination end station. Frames ultimately arriving at the wrong end station are simply dropped but all intermediate stations which the flooded frame arrives at, that do not have knowledge of the frame's particular destination MAC address, will also, in turn, flood the frame out of all but one port. This system creates a lot of network traffic, with all but one of the resulting frames being discarded on delivery to the end stations.

Most communications over Ethernet use full duplex connections between stations. This means that a frame is usually returned by its destination to the originating source, with the source becoming the return frame's destination and visa versa. A frame's return path will already have its route recorded in the Ethernet Bridge MAC address look-up tables, placed there during the original frame's outward journey and so network flooding does not usually occur on a frame's return journey. Over time the MAC address look-up tables of each Ethernet Bridge become populated with the address and port number mappings for all the end stations accessible through one or more intermediate stations. Gradually, also, the flooding behaviour of a network will subside as the MAC address look-up tables become more completely populated.

The MAC address population mechanism described above makes Ethernet networks simple to install as the routes across the network are effectively configured automatically. The drawback of this technique is that frames with unknown MAC addresses cause a large amount of network traffic during the frame floods. This is relatively unimportant for small networks but can become a severe problem for very large networks with many thousands of active MAC addresses. In particular, during the initial period when MAC addresses are unrecognised, flood-storms cause a significant amount of additional traffic and network load.

A limiting factor in large networks is the size of the MAC look-up tables of each Ethernet Bridge. Ideally each MAC table should be capable of concurrently holding all the active MAC addresses of the entire network. If the MAC look-up tables are not capable of holding all active MAC addresses, new MAC addresses will end up displacing in the look-up table older but still active MAC addresses. As noted above, unknown addresses cause a frame to be flooded across the network. Therefore, where the Ethernet Bridges' MAC look-up tables are not able to support all active MAC addresses this flooding behaviour will continue past the usual network initialisation phase as a result of such address displacement. As the network dimension increases the flooded frames will cause a proportionately large amount of traffic and network load, significantly degrading performance of the network.

There can be tens of thousands of MAC addresses in a large network. MAC tables are costly in terms of silicon real estate and the memory used to construct the look-up tables is particularly expensive. Furthermore large memory devices are slow. Size and cost prohibits very large MAC address tables, and currently a table capable of containing 8,000-16,000 is typical of the balance between size, cost and speed. However, this is not large enough to manage the predicted growth in network dimension.

Known ways of implementing a MAC address table include fully associative CAM structures through set associative caches, table based structures and some include additional mechanisms to cope with cache conflicts. The active MAC addresses are scattered in a 48 bit address space but the distribution is difficult to predict. MAC addresses are a property of the Ethernet endpoint and MAC addresses are allocated in blocks to the manufactures of Ethernet equipment. A single large Ethernet installation may have a number of contiguous blocks of MAC address space as well as many isolated addresses and these can appear anywhere within the 48 bit space. Unless a fully associative cache or similar mechanism is used then the MAC table must be significantly over-sized in order to be sure that all active MAC addresses can be held concurrently. This is unacceptable for the previously stated size and cost implications.

The information held in intermediate stations of a network may be different depending upon the supported Ethernet protocol but the discovery process and the look-up table's subsequent use is common to both Ethernet Data Link Layer Bridges and Network Layer Routers. In order to illustrate the principle the description provided herein is specific to a Data Link Layer Bridge. However, the method extends to Network Layer Routers and other uses of look-up tables outside of these protocols and address mappings.

DESCRIPTION OF RELATED ART

In US 2007/0047540 an Ethernet switch is described where individual ingress ports are provided with local look-up tables. Only forwarding information that a port will use is stored in the local look-up tables. However, the Ethernet switch requires a master MAC address table which feeds the local tables with forwarding information. A similar arrangement of local look-up tables and a master table is also described in EP 0993156.

The present invention seeks to overcome the problems encountered with conventional networks and in particular seeks to overcome the limitations of network address tables to provide an Ethernet bridge capable of supporting many tens of thousands of ports.

SUMMARY OF THE INVENTION

The present invention therefore provides a multi-path network for use in a bridge, switch, router, hub or the like, comprising a plurality of network ports adapted for connection with one or more devices, each device having a different identifying address data; a plurality of network elements; and a plurality of network links interconnecting the network elements and connecting the network elements to the network ports, wherein the multi-path network further comprises separately addressable memory elements each adapted for storing device address data and the multi-path network is adapted to distribute a plurality of device address data amongst the plurality of memory elements.

Preferably, the memory elements are organised hierarchically in at least two levels with a plurality of separately addressable memory elements at each hierarchical level and the multi-path network being adapted to distribute a plurality of device address data amongst a plurality of memory elements in an uppermost hierarchical level.

Ideally, the network is adapted to store the address data of all devices connected to the network in the memory elements of the uppermost hierarchical level. Also, the address data for a device is preferably stored at only one memory element in an uppermost hierarchical level.

With the network the storage capacity of an individual memory element is less than the quantity of device address data to be stored and each one of the memory elements may form part of a corresponding network element.

In a preferred embodiment the network is adapted to generate a hash value based on the device address data. Ideally, the network is adapted to sequentially use one of a plurality of hash functions which generate different hash values for the same device address data.

Each one of the memory elements at the lowermost hierarchical level may include a single bit array containing address information relating to the device address data. In a preferred embodiment the network is adapted to refresh the contents of the memory elements in the uppermost hierarchical level by communicating the address information stored in the single bit arrays to the memory elements in the uppermost hierarchical level at predetermined time intervals. The network may be further adapted to update at least one memory element in the uppermost hierarchical level with a new device address data when a data packet with the new device address data is received at a network port for transmission across the network and the bit accessed in the single bit array for the new device address data is clear. The network may also be adapted to set the accessed bit with the new device address data in the single bit array when an update for a memory element in the uppermost hierarchical level is generated.

Ideally, the network is adapted to read the device address data of a data packet received at a network port only once during transmission of the data packet across the network and the network is adapted to communicate the device address data between hierarchical levels.

Furthermore, the network elements may be adapted to clear the bits of the single bit arrays at predetermined but infrequent time intervals. The device address data may also be cleared from their respective memory elements after a predetermined time interval. The network elements may be adapted to extend the predetermined time interval before the device address data is cleared if the device address data is present in any memory element at a higher hierarchical level. Also, the network elements may be adapted to extend the predetermined time interval before the device address data is cleared if the device address data is observed to exist for one or more devices connected to the network port of the network element at the lowermost hierarchical level. More particularly, the network elements may be adapted to clear device address data from their respective memory elements when the device address data is not present in any memory element at a higher hierarchical level. Thus, the memory elements at the lowermost hierarchical level are adapted to indicate the presence or absence of address data in memory elements at the uppermost hierarchical level.

In a further aspect the present invention provides an Ethernet bridge or router including a multi-path network as described above.

In a still further aspect the present invention provides a method of device address data management in a multi-path network comprising a plurality of network ports adapted for connection with one or more devices, each device having a different identifying address data; a plurality of network elements; a plurality of network links interconnecting the network elements and connecting the network elements to the network ports; and a plurality of memory elements adapted to store device address data, the method comprising distributing a plurality of device address data amongst the plurality of memory elements for storage.

Preferably the method further comprises the step of organising the memory elements hierarchically in at least two levels with a plurality of separately addressable memory elements at each hierarchical level and distributing the device address data across the plurality of memory elements in an uppermost hierarchical level. The device address data for a particular device is stored in one or more but not all memory elements in an uppermost hierarchical level. More preferably, the device address data for a particular device is stored in only one memory element in an uppermost hierarchical level.

Optionally, each one of the memory elements forms part of a corresponding network element.

In a preferred embodiment, a hash value is generated based on the device address data. Ideally, a plurality of different hash values are generated for the same device address data using a plurality of different hash functions in turn. The contents of the memory elements in the uppermost hierarchical level may be updated by communicating the hash values stored in the single bit arrays to the memory elements in the uppermost hierarchical level at predetermined time intervals. It is to be understood that in the context of this document reference herein to device address data is intended to encompass address data such as MAC addresses as well as data derived from such address data such as the hash values mentioned above.

Ideally, at least one memory element in the uppermost hierarchical level is updated with a new device address data when a data packet with the new device address data is received at a network port for transmission across the network and the bit accessed in the single bit array for the new device address data is clear. Also, an accessed bit for the new device address data may be set in the single bit array when an update for a memory element in the uppermost hierarchical level is generated.

Ideally, the device address data of a data packet received at a network port is read only once during transmission of the data packet across the network and device address data hash values are communicated between hierarchical levels. In a preferred embodiment destination device address data is converted to egress network port descriptors and data packets are routed across the network on the basis of the egress port descriptors.

More ideally, the bits of the single bit arrays are cleared at a first predetermined time interval and the device address data is cleared from their memory elements after a second predetermined time interval where the first and second predetermined time intervals may be different. Preferably, the predetermined time interval before the device address data is cleared is extended if the device address data is present in any memory element at a higher hierarchical level. Also, the predetermined time interval before the device address data is cleared may be extended if the device address data is observed to exist for one or more devices connected to the network port of the network element at the lowermost hierarchical level. With the preferred embodiment device address data is cleared from memory elements when the device address data is not present in any memory element at a higher hierarchical level. Thus, the memory elements at the lowermost hierarchical level may be used to indicate the presence or absence of device address data in memory elements at the uppermost hierarchical level.

With a preferred embodiment of the present invention at least some of the plurality of memory elements are address caches and the method of device address data management in a multi-path network comprises a refreshing step of validating in turn each entry in an address cache by inspecting the contents of a higher level address cache in order to maintain coherency between the address caches.

Thus, with the present invention a multi-path network and a method of device address data management is provided which is truly scalable as the device address data, for example MAC addresses, are distributed amongst the plurality of memory elements of each network element in the multi-path network. That is to say each MAC address is not copied to every one of the memory elements in the network.

BRIEF DESCRIPTION OF THE DRAWINGS

The foregoing and other aspects and advantages will be better understood from the following detailed description of a preferred embodiment of the present invention with reference to the drawings, in which.

DETAILED DESCRIPTION OF THE PREFERRED EMBODIMENT

The Ethernet bridge or router described below introduces an additional protocol layer, referred to herein as an 'Encapsulation Layer', that appears between the Physical Layer and the Data Link Layer of the standard OSI model which can encapsulate both Network Layer and Data Link Layer PDUs. In the context of this document the definitions of an intermediate station is extended to include a station capable of forwarding packets encapsulated at the additional protocol layer referred to herein as the Encapsulation Layer. This type of station will be referred to herein as a Bridge Fabric or Network Fabric. A multi-port Bridge Fabric may be implemented by a collection of Bridge Fabric Switches (BFSs) interconnected by Bridge Fabric Switch Links (BFSLs). Complete encapsulation in a PDU, which is the subject of co-pending United Kingdom patent application number 0807937.8, the whole contents of which is incorporated herein by reference, and which is referred to herein as a 'Fabric Protocol Data Unit' (FPDU), avoids the necessity of modifying the underlying PDU frame headers or trailers, and thus removes the overhead of recalculating the cyclic redundancy check (CRC) or other derived information based upon the contents of the frame. A FPDU is used in implementation of data transmission, acknowledgement and flow-control mechanisms. A FPDU can be further utilised to provide many other attractive features important to large, high performance, scalable Ethernet networks, such as the address fetching facility of the present invention.

Figure 1:
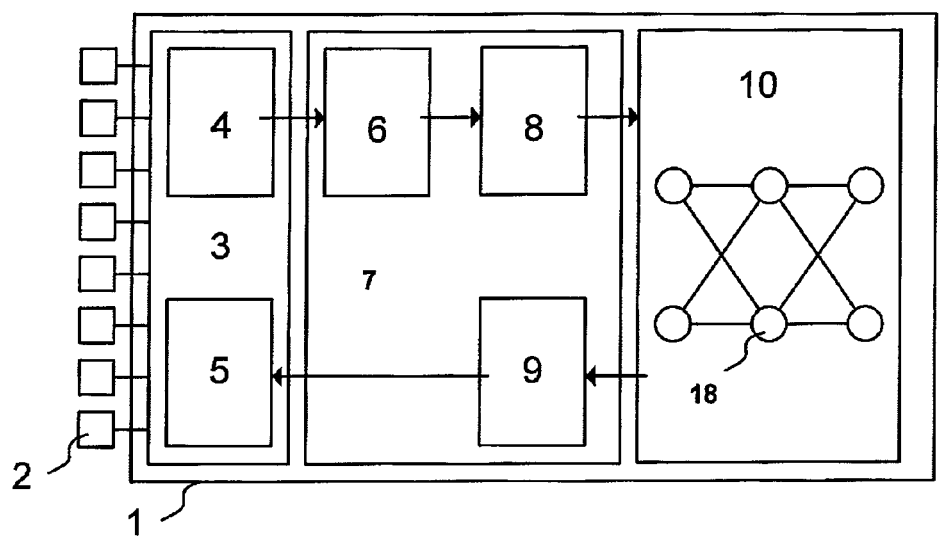
FIG. 1 illustrates schematically an Ethernet bridge that includes a multi-path network which implements a distributed address look-up table in accordance with the present invention.

An Ethernet bridge or router 1 is illustrated in FIG. 1 which may be connected to a plurality of separate Ethernet stations 2 and which implements the encapsulation of both Network Layer and Data Link Layer PDUs in a FPDU. The Ethernet bridge 1 generally comprises a multi-path network 10 in combination with a plurality of Ethernet ports 3 (only one is illustrated for the sake of clarity) with each port being individually connectable to an Ethernet station 2. The Ethernet ports 3 are generally conventional in design and each includes means for establishing a data connection with an Ethernet station, a receiving means or input 4 for performing Ethernet receive functions and a transmitting device or output 5 for performing Ethernet transmit functions.

The Ethernet ports 3 are connected to a network interface 7 that provides conventional functionality such as packet buffering 6. However, the network interface 7 additionally includes an Ethernet PDU encapsulator 8 which connects the network interface 7 to ingress ports (not shown) of the network 10 and an Ethernet PDU decapsulator 9 which connects egress ports (not shown) of the network 10 back to the Ethernet ports 3. The Ethernet PDU encapsulator 8 implements the protocol of the Encapsulation Layer and thus is responsible for the generation of the FPDUs. Ideally, each port 3 of the Ethernet bridge 1 has a respective network interface 7 and thus a respective Ethernet PDU encapsulator 8 and a respective Ethernet PDU decapsulator 9.

Figure 2:
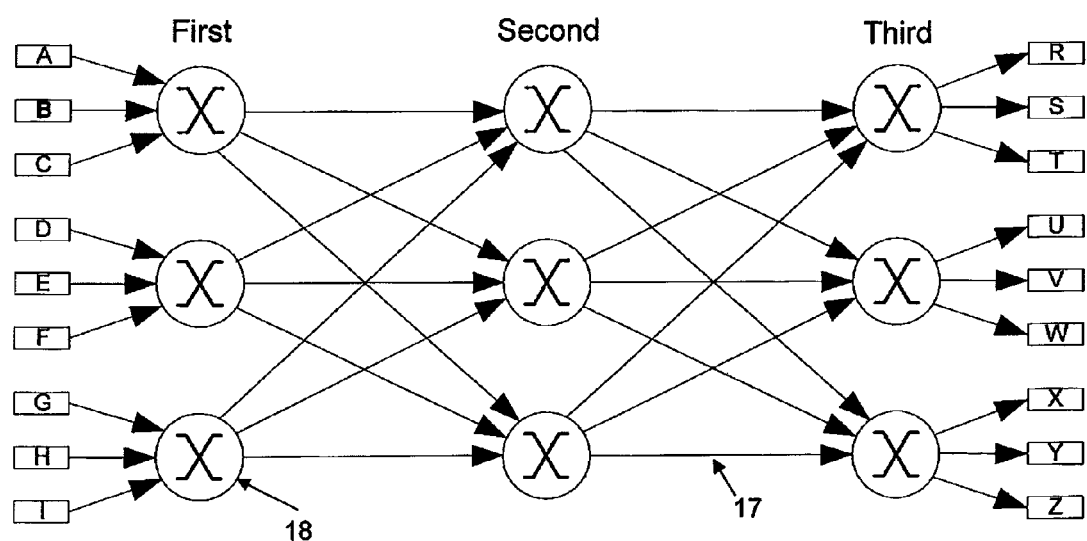
FIG. 2 is a schematic diagram of a multi-path network in accordance with the present invention for use in the Ethernet bridge of FIG. 1 having three stages.
Figure 3:
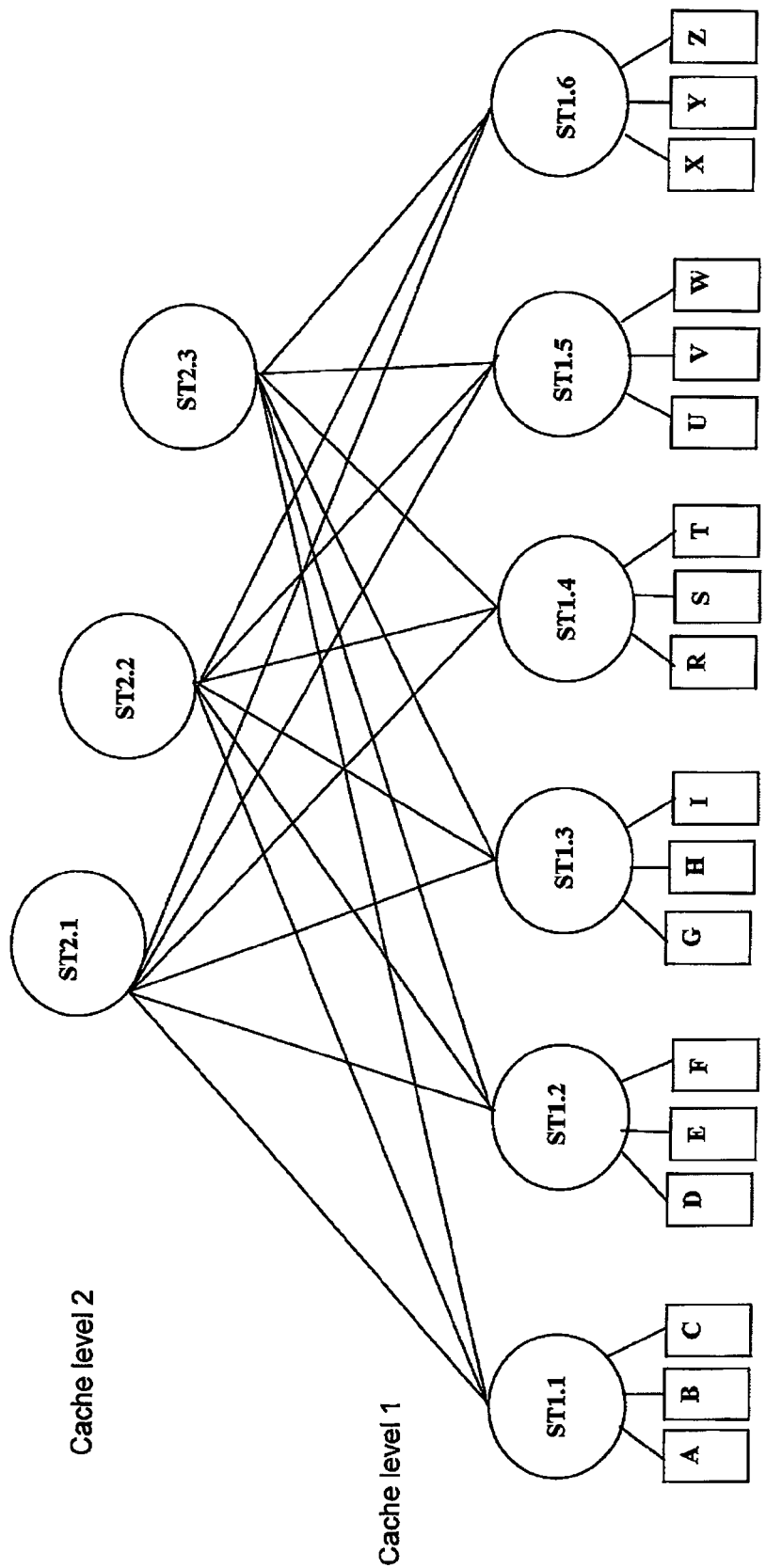
FIG. 3 illustrates the network of FIG. 2 as a Clos network.

The network 10, which is a proprietary multi-path network such as the one shown in FIG. 2, comprises a plurality of interconnected network elements 18 referred to herein as bridge fabric switches (BFSs) interconnected by network links 17 in the form of bridge fabric switch links (BFSLs). Each BFSL 17 is preferably a bi-directional (full duplex) connection. Data is sent in each direction and acknowledgments and flow control state data in one direction can be multiplexed with the data sent in the opposite direction of the BFSL 17. The example shown is a small network where each BFS 18 has only 6 ports and two levels of switching: the first and third switch stages being a first level of switching and the second stage of switching being a second level of switching. In FIG. 3, the same small network is illustrated as a Clos network to illustrate how the different switching stages correlate to the different switching levels. A BFS 18 would normally be expected to have at least 16 ports and for large networks more levels of switching would be required. Typically, for an Ethernet Bridge with 512 ports constructed with 16 port BFSs 18, 64 switches might be used in a first layer of switching and 32 switches in the second switching level, while for an Ethernet Bridge having approximately 48,000 ports and using a higher arity switch, 4700 BFSs 18 might be used in 4 switching levels. In the example shown in FIG. 2 the first and third stages of BFSs 18 are referred to as edge BFSs because they are present at the edge of the network, i.e. the first switch of the network 10 seen by an incoming FPDU and are thus the first level of the network. BFSs 18 located away from the edge are termed intermediate BFSs and in FIG. 2 comprise the second stage and also the second level of switching. Although the BFSLs 17 are illustrated in FIG. 2 with a data flow direction, the direction is provided for illustration purposes only. In practice any and all of the ports A-Z will function at different times as ingress and egress ports with FPDUs being transported across the illustrated network in both directions.

The multi-path network and the method of MAC address management described herein is based on the principle of a distributed network address look-up table. As mentioned earlier, conventionally the MAC look-up table is a single complete entity at each edge and each intermediate station of the network. This might be implemented as a single central MAC table with local MAC table caches close to the Ethernet ports. By contrast, the network described herein employs a distributed MAC address table, whereby the MAC address, table is split into a plurality of entities in the form of separately addressable sub-tables stored in a corresponding plurality of memory elements whereby individual MAC addresses are distributed around the network with any one of the memory elements storing only a sub-group of the total number of active MAC addresses and the collection of MAC addresses in the sub-groups varying between sub-groups. This method is inherently scalable as there is no single point of entry into a central MAC address store.

Due to the fact that the total number of active MAC addresses are distributed amongst a plurality of sub-tables, each sub-table of the MAC address table may be kept small e.g. 32,000 address entries. This in turn means that each memory element is small, in comparison with conventional MAC address memories, and on its own a memory element is not capable of containing all of the active MAC addresses of the network. However when the individual memory elements are taken in aggregate, it is then possible to store reliably all of the active MAC addresses of the network and thereby minimise the need for data packets to flood the network.

Each one of the sub-table memory elements ideally is co-located with a respective BFS 18 of the network 10. If a larger network 10 is required to accommodate more ports, it will be necessary to utilise more BFSs 18 to cope with the additional switching requirements. As the number of BFSs 18 is increased the number of sub-table memory elements is correspondingly increased. Thus the distributed MAC address look-up table of this network is truly scalable. Of course alternative arrangements of and locations for the sub-table memory elements in the network are envisaged as is most convenient for each multi-path network.

Figure 4:
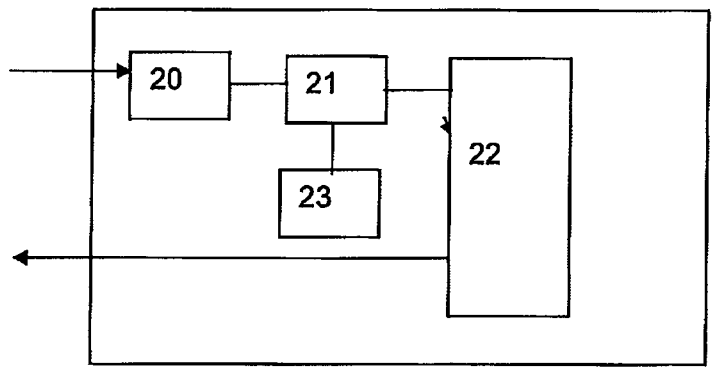
FIG. 4 is a schematic diagram of an arrangement of sub-tables of a MAC address look-up table in accordance with the present invention for use in the Ethernet bridge of FIG. 1.

In FIG. 4 the structure of one of the BFSs 18 is illustrated in greater, but simplified, detail. Thus the BFS 18 includes a crossbar 22 the input to which is fed via means for performing FPDU buffering 20 and a MAC table processor 21 and a MAC address sub-table memory element 23, the operation of each of which will be described in greater detail below.

As illustrated in FIG. 3, the MAC address sub-tables are organised into two hierarchical levels to implement caching on multiple levels. Of course, the sub-tables may be organised over three or more caching levels in dependence upon the memory resources available, the number of electronic devices connected to the network and hence the number of active MAC addresses. Ideally, the first level cache is small in size so that looking up MAC addresses in the first level cache is fast (very low latency) and capable of keeping up with small sized but frequent data requirements that may arise with a high rate of small network packets. Theoretically the second level cache is much bigger in size than the first level cache. The second level cache will have a higher latency read access but to counter the consequential reduction in bandwidth a much larger quantity of data is provided in the second level cache memory albeit that the quantity of data is distributed between a plurality of individually addressable MAC sub-tables organised on the same hierarchical level. The data accesses made from the first to the second level cache are normally set to the size of a MAC table entry. Where a third or higher cache level is employed, these may follow the trend again and may be much bigger than the second level cache. It is, of course, to be understood, that the MAC address management methodology is equally applicable to network topologies other than the Clos network illustrated in FIG. 3.

In the Ethernet bridge of FIG. 1 the network port interface 7 includes a MAC address look-up table to translate incoming Ethernet frames' destination MAC addresses into egress ports of the network fabric 10. Unlike conventional Ethernet Bridges, where a MAC table lookup is performed in each hop through the network, with the Ethernet bridge or router described herein this translation between the destination MAC address and the egress network port is performed only once on entry to the network. The edge located MAC address table of each network port is thus used as a first level cache. The MAC look up tables of the intermediate BFSs function as second, third etc. level caches.

As is best illustrated in FIG. 3, each edge BFS connects directly to a number of intermediate BFS, three intermediate BFSs in FIG. 3. For simplicity and reliability in manufacture, ideally each of the MAC address tables in the second cache level is the same size as the MAC address tables of each of the first level cache. However, as each first level cache is linked to a plurality of separately addressable second level cache, three caches in FIG. 3, the second level cache can be organised so that it appears as a single MAC table that is three times the size of the first level cache table. Clearly where the network employs more MAC tables at the second level e.g. eight tables, then the MAC table at the second level cache is eight times the size of the first level cache.

As mentioned earlier each one of the first level MAC sub-tables ST1.1, ST1.2, ST1.3, SST1.4, ST1.5 and ST1.6 is associated with a respective edge BFS 18. Each one of these edge BFSs 18 is able to receive and transmit data packets with certain ports of the network, e.g. MAC sub-table ST1.1 forms part of the edge BFS which communicates with network ports A, B and C and MAC sub-table ST1.2 forms part of the edge BFS which communicates with network ports D, E F, etc. In turn, each one of the edge BFSs is able to further communicate with second level cache in the form of MAC sub-tables ST2.1, ST2.2 and ST2.3. It will be clear to the skilled person that the number of sub-tables, the number of cache levels and the number of links between the BFSs is not intended to be limited. Also, it will be appreciated that not all intermediate BFSs 18 need be provided with sub-table memory elements 23 or even if provided, not all of the memory elements of the BFSs need be employed as part of the MAC address management protocol. However, ideally the number of memory elements 23 that are required at the uppermost caching level of the network should at least be sufficient to store all of the active MAC addresses of the network.

Entries are created in the MAC address table 23 when an Ethernet frame arrives at a network port with an unknown source MAC address. In overview, source MAC addresses to network port translations are ideally stored in the highest level BFSs 18 so that they can be found when other edge BFSs 18 perform destination MAC address look-ups. The MAC address entries in the sub-tables of the highest level BFSs therefore include all of the active MAC addresses in the network so that, after discovery, a MAC address to port translation is always available to all network ports. In order to reduce MAC address translation traffic (so-called coherency traffic) with respect to the highest cache level MAC address sub-tables, a local source MAC address learning rate limiting table (LRLT) is also maintained in association with each of the edge BFSs. The LRLT contains the source MAC addresses that have been communicated from that edge BFS to the highest cache level BFSs 18. The local source MAC address is preferably implemented in the form of a single bit array (not shown) in which each one of the source MAC addresses of devices in communication with the edge BFS is indexed as a single bit. When an Ethernet frame arrives at an ingress port of the network the source MAC address of the Ethernet frame is put into a hash function to form a bit address. This bit address is then used to index the source bit array to check whether the source MAC address of the frame has already been written to the highest level BFS 18.

If the accessed bit in the source bit array is clear, that is the source MAC address has not been written to the highest level cache, then the bit is written and set in the source bit array and a message is sent to the highest level BFSs to indicate that a new source address has been received. If the accessed bit is already set in the source bit array then no further action is required with regards the management of the MAC address. Being a bit array, a relatively small RAM is capable of holding rate limiting state for a very large number of source MAC addresses. The number of source MAC addresses that can be held is roughly proportional to the number of bits in the array. It is expected that each full MAC table entry will require approximately 80 bits of state so this bit addressing mode achieves a factor of 80 improvement in source address density. A single LRLT can support a number of local ports. Currently each LRLT is expected to support 250,000 source MAC addresses. The LRLT is designed to reduce the total MAC address translation traffic which maintains the MAC address translations held in the highest level caches. However the LRLT should not remove MAC address translation traffic altogether. The updated rate should be approximately 10 times faster than the rate the MAC address translations held in the highest level caches are aged out.

Distributing the storage of all of the active MAC addresses across the network 10 relies on an efficient MAC address management protocol to retrieve and write MAC addresses to and from the distributed sub-tables at the higher caching levels. With the network described herein the MAC address management protocol forms part of the Encapsulation Layer protocol, the operation of which is described below.

Figure 5:
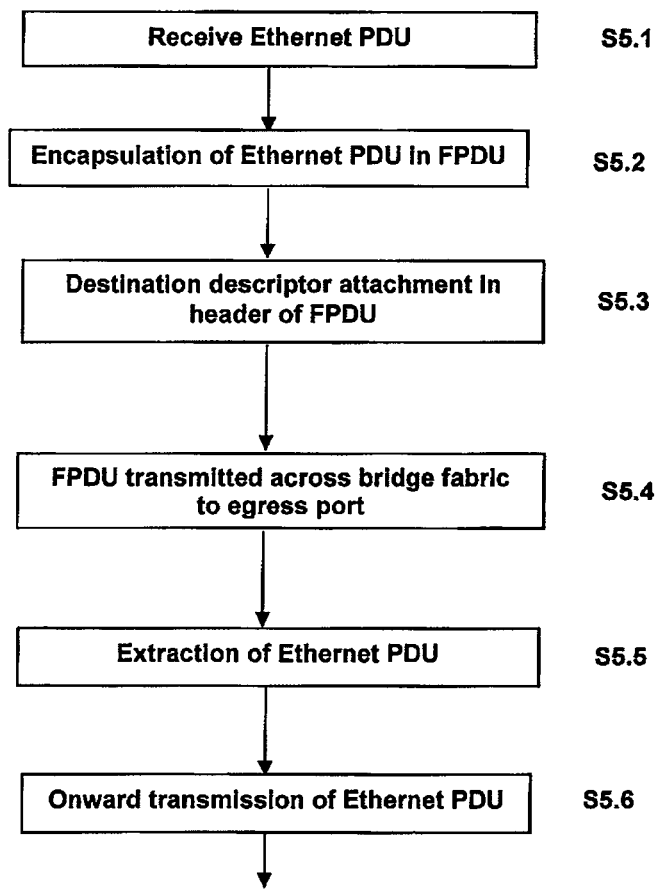
FIG. 5 is a flow diagram of a method of data delivery across a network in accordance with the present invention.

A method of data delivery across the network fabric 10 which implements the protocol of the Encapsulation Layer is illustrated in FIG. 5. Encapsulation occurs at ingress to the Ethernet bridge 10. An Ethernet PDU transmitted by an Ethernet station 2 is received S5.1 at a network port 3 of the Ethernet bridge 1 and is communicated via the receiving device 4, which performs conventional Ethernet receiving functions, to the network interface 7 and in particular the Ethernet PDU encapsulator 8. The encapsulator 8 attaches S5.2 a FPDU header to the Data Link Layer frame.

The encapsulator 8 also extracts the source and destination MAC addressing information from within the Ethernet PDU and translates the destination MAC addressing information into a destination descriptor S5.3 that identifies the network egress port required for the destination MAC address and thus the route across the network fabric 10. The translation of the destination MAC address into a destination descriptor is performed using data held in the distributed MAC address sub-tables. The destination descriptor is determined using an egress port value which is determined from the MAC address look-up table, in which port numbers are correlated with MAC addresses accessible via each of the ports. The retrieval of this data from the MAC address look-up table and the population of the distributed MAC address table will be discussed in detail below. The destination descriptor obtained using the distributed MAC table is then added to the FPDU header.

The FPDU is then transmitted S5.4 from the ingress port of the network fabric 10 across the network 10 via a plurality of network fabric elements 18 to an egress port of the network. At egress from the network 10 the FPDU information is stripped S5.5 by the Ethernet PDU decapsulator 9 so that only the original Ethernet PDU remains. The unmodified Ethernet PDU is then forwarded S5.6 to an Ethernet station which is the required destination for the PDU. Thus, the protocol and mechanisms enabling transport of the data across the network 10 are completely contained within the network and are invisible to the Ethernet stations at both ingress and egress.

There are several different routing mechanisms by which FPDUs may be transmitted across the network which may affect the details of the content of the destination descriptor. These details lie beyond the scope of the present document. For example, the FPDUs may be dynamically routed across the network in which case packet ordering is required. The management of packet ordering in such a network is the subject of co-pending United Kingdom patent application number 0808862.7. However, to maximise the benefit derived from the MAC address management system as an FPDU is transported across the network the destination MAC address is not read at each BFS. Instead, the destination descriptor which was added to the encapsulation of the Ethernet frame by the network interface 7 may be used to determine forward transmission of the FPDU across the network. Ideally, the destination descriptor and, optionally, any ordering requirements associated with the FPDU inform the selection of the next BFSL at each BFS using only small amounts of state. Benefits in terms of low latency and high bandwidth are maximised when the multi-path network is arranged to perform dynamic routing of FPDUs. However, the MAC address management system is not limited to dynamic routing or to the network structures illustrated herein.

FPDU encapsulation of the entire Ethernet PDU enables significantly improved speed of delivery of Ethernet frames across the network fabric, and reduced latency, because the Ethernet PDU contents is not required to be inspected or modified in any way during delivery across the network. The bridge therefore appears at the edge of the Ethernet network as a single entity. Appearing as a single entity means that only one conversation between two endpoints needs to take place to make the MAC addresses of these end points available to all the other endpoints in the system. A conventional Ethernet network would require thousands of separate conventional Ethernet Bridges to construct a similar sized network and many conversations would be necessary at each hop from conventional Bridge to conventional Bridge, causing repeated flooding of the network.

More importantly, the Encapsulation Layer protocol allows additional delivery controls and utilisation of the infrastructure of the network fabric to provide a distributed storage solution for the network address look-up table.

The Encapsulation Layer protocol preferably includes the use of control tokens. These tokens are multiplexed onto the BFSLs of the network along with the FPDUs. That is to say, the control tokens are permitted to interrupt the payload of an FPDU which is in the process of being delivered across the network. Thus encapsulation of the Ethernet PDU also improves the delivery latency of the control tokens by allowing them to be inserted within the encapsulated Ethernet PDU. A large PDU can take microseconds to be transmitted. Allowing the tokens to briefly interrupt the encapsulated Ethernet PDU has little effect on the delivery time of the FPDU but reduces the delivery time of the token from multiple microseconds to tens of nanoseconds.

In the context of this document the particular functionality of the control tokens of interest is the use of the control tokens in fetching address translations. Of course, the control tokens may be employed in other areas of network management, for example congestion management and delivery acknowledgement. Furthermore, such control tokens may range from one or two word tokens up to five or more word tokens depending upon the control functionality required.

A FPDU will have to cross many links in a large network. Each time the FPDU arrives at a new BFS the egress port from the BRS must be determined quickly from the route information. As mentioned earlier, for Ethernet protocols the route information is held in ether the MAC address at Layer 2 or the IP address at Layer 3 and the translation process is complex and can significantly add to the routing latency. Encapsulation allows the translation of the MAC address or the IP address to be performed on fewer occasions and ideally only once for each FPDU crossing the network.

Figure 6:
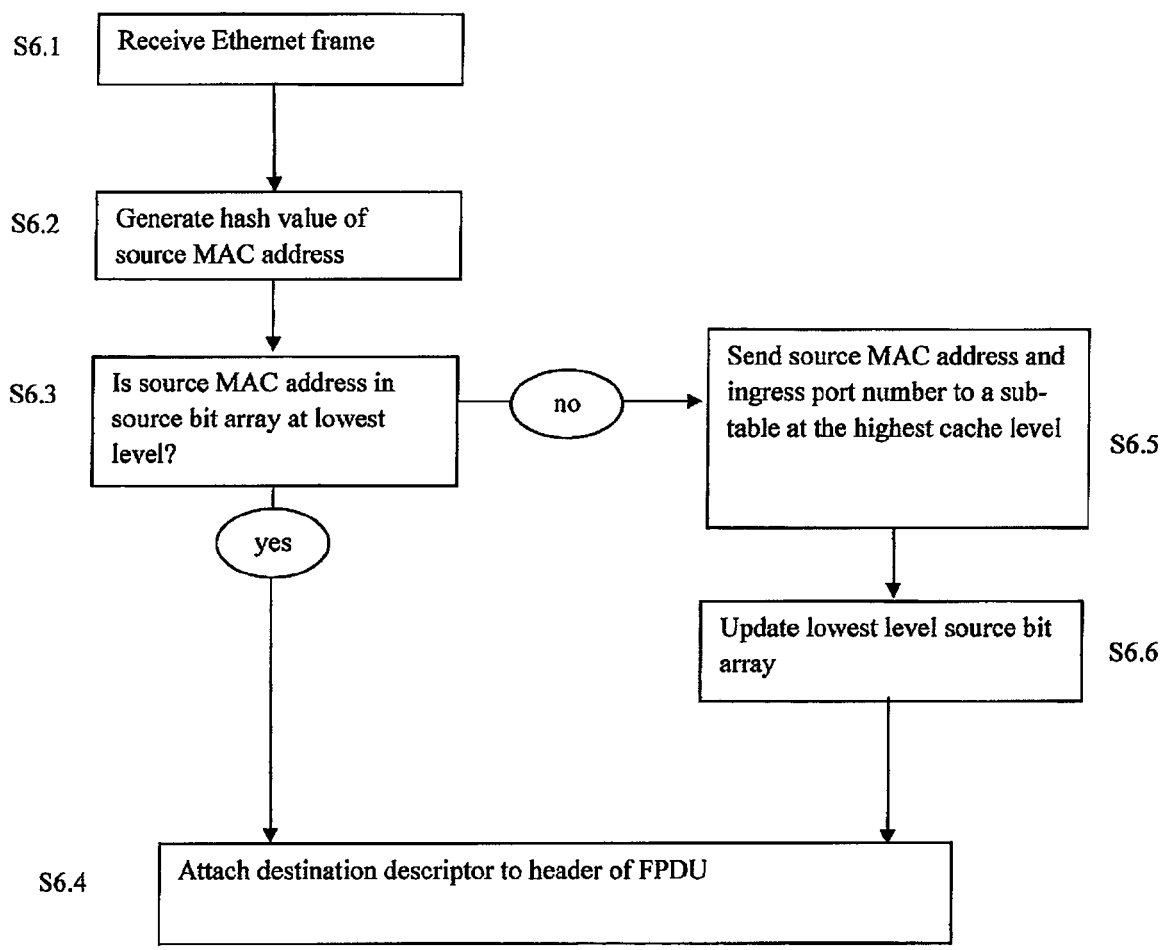
FIG. 6 is a flow diagram of a method of copying an entry to an address table in accordance with the present invention.

As mentioned earlier, the distributed MAC address look-up table needs to be populated to enable the translation of MAC address to egress port numbers. The population and refresh methodology is shown in FIG. 6. As described earlier, a frame transmitted by an Ethernet station 2 is received S6.1 at a network port 3 of the Ethernet Bridge. The source MAC address is read from the frame and a hash function generated S6.2. The hash function is checked against the contents of the LRLT S6.3 of the edge station 18 to see whether the source MAC address is present in the table of the highest level BFSs 18. If the accessed bit is set then encapsulation of the frame continues with a destination descriptor being attached to the header of the FPDU S6.4 based on the destination MAC address, which will be described in greater detail below.

If the accessed bit is clear then the bit is written to set in the LRLT S6.6 and a message is sent to the highest BFSs 18, in the form of a control token, with details of the new source MAC address which is then copied S6.5 to one of the MAC sub-tables at the highest cache level where it can be found when other edge BFSs 18 perform destination MAC address lookups in future. Once the bit has been set in the LRLT for the new source MAC address, encapsulation of the frame continues with a destination descriptor being attached to the header of the FPDU S6.4 based on the destination MAC address.

In order to ensure that the MAC addresses in the highest cache level sub-tables represent active addresses a conventional aging-out process is employed whereby MAC addresses that have not been accessed for a given period of time are removed from the sub-tables at the highest cache level. The period could be a number of minutes or reduced to a few seconds in circumstances where a managing agent is employed to manage the network. Similarly, the bits in the LRLTs of the edge BFSs are also cleared at regular but infrequent intervals. Preferably, all of the bits in the LRLTs are cleared preferably at between 4 and 10 times faster the normal aging period of an entry in the distributed MAC table at the highest cache level. This process helps to further reduce coherency traffic as the highest cache level sub-tables will receive updates of active source MAC addresses each time a LRLT is cleared and an active source MAC address re-discovered by the network port.

Occasionally the hash value generated by the hash function for two different MAC addresses will be the same. In this case both MAC addresses will access the same bit in the bit array. This will prevent the learning of the second MAC address at the highest level cache because the first MAC address will have already set the bit in the array. This problem is avoided by serially changing the hash function used to access the bit in the array. Each time the hash function is changed a completely different set of bits will be accessed for each MAC address. The probability of two particular MAC addresses accessing the same bit for a single hash function is quite large. The probability of the same two MAC addresses accessing the same bit after the hash function has been changed is extremely remote. With a plurality of different hash functions being employed sequentially all device MAC addresses will regularly find a unique bit in the bit array and will therefore have a learning message sent to the highest level cache. Preferably, the hash function is changed for every complete cycle of clearing all the bits in the bit array.

Copying the source MAC address to the highest cache level sub-tables is performed using another hash function of the source MAC address. This is a different hash function from the hash function used to access the bits in the bit array. This hash function associates the source MAC address with one of the many MAC sub-tables in the BFS 18 at the highest level caches. The hash function is chosen so as to distribute the address data evenly throughout the BFS sub-tables at the highest cache levels. The hash value forms the address for conventional interval routing across the network to direct the source MAC address and source ingress port number or Source MAC Fill Request (SMFR) to the highest cache level. The route value (in this case the hash value) is compared against upper and lower bounds to select the output port the MAC table source fill request should be sent from. The whole hash value ranges is evenly distributed between the BFS sub-tables of the highest level caches. In a small network there will be a small number of highest level caches and in this case each will take a large number of hash values so as to completely cover the whole number space of the whole hash value. In a very large network there will be thousands of highest level caches and so each will only need to accept source MAC address translations for just a few hash values. In all cases every hash value will normally be routed to only one top level BFS MAC sub-tables. It is important that the same hash function is used throughout the whole network. This ensures that a particular MAC address will always be found in the same place, no matter where the initial request for a translation is made from.

Using conventional interval routing also makes the address translation process tolerant to faults on BFSLs. If the network has a Clos configuration as shown in FIG. 3 then an alternative route will probably be available to the desired top level BFS MAC sub-tables. When the interval routing mechanism initially tries to direct the SMFR to a faulty or disconnected BFSL then simply sending the SMFR to another BFSL that is not the BFSL the SMFR arrived at will probably allow the SMFR to reach the desired top level BFS MAC sub-tables.

Figure 7:
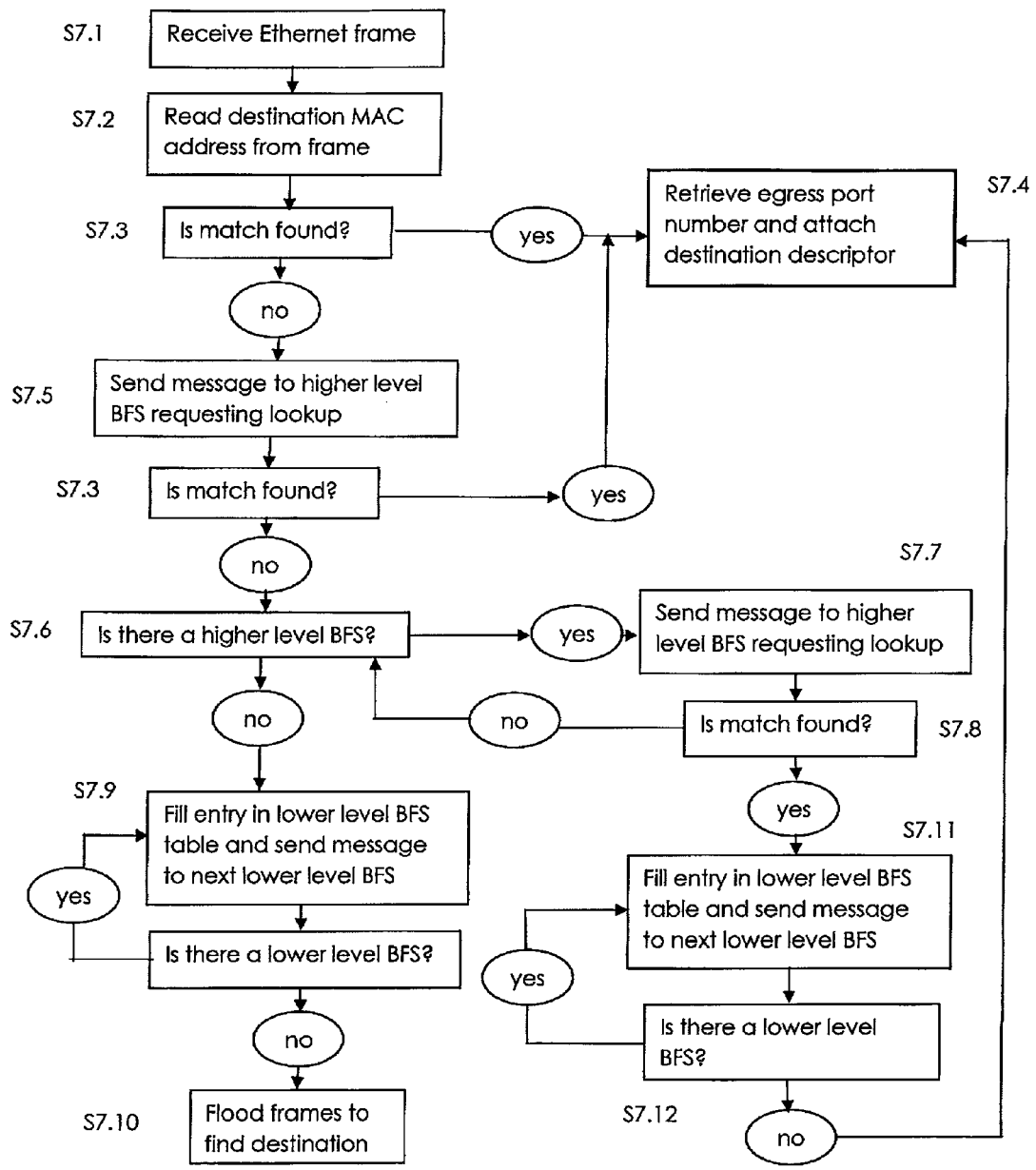
FIG. 7 is a flow diagram of a method of retrieving an entry from an address table in accordance with the present invention.

FIG. 7 shows in greater detail how the destination descriptor of S5.3 in FIG. 5 is obtained from the distributed MAC addresses. When a frame is received at an ingress port S7.1 and the destination MAC address is read from the frame S7.2. A MAC address look-up is performed by generating a hash function derived from the destination MAC address of the frame. The MAC table processor 21 (FIG. 4) receives the hash function and compares it with those stored in the MAC sub-table memory element 23 to look for a match S7.3. Where a match is found the destination MAC address is associated with the egress port number of the network required for the frame to be delivered to the destination MAC address and this is communicated to the encapsulator 8 (FIG. 1). The encapsulator 8 then generates a destination descriptor which includes the egress port number along with any additional information, e.g. priority, relevant to the routing of the frame across the network and the destination descriptor is added to the encapsulation of the frame S7.4.

If no match is found in the sub-table memory element 23 of the edge BFS 18 then the new hash function based on the destination MAC address is used to select a link to look for a relevant egress port number. The edge BFS 18 sends a small, low latency message to the next higher BFS 18 requesting look-up S7.5. The next higher BFS 18 performs a look-up and if still no match is found and if there is a higher level BFS 18 S7.6 the steps are repeated S7.7 and S7.8. If the highest level BFS does not return a match then this is communicated back to the ingress port via progressively lower level BFSs 18 S7.9 until the edge BFSs is reached. The FPDU is then flooded to all other ports S7.10.

If a match is found in a higher level BFS 18 then the entry is returned on each of the same links on which the request was received by the BFSs. The entry is written into the sub-tables of each of the BFSs 18 that it passes through S7.11 and S7.12. In this way the most frequently used destination MAC addresses will be available for look-up at individual edge BFSs that are regularly receiving frames intended for those destination addresses and which are most quickly accessible to the encapsulator 8. On the other hand, less regularly used MAC addresses will still be found but more remotely from the encapsulator 8. It should be noted, however, that the MAC address management system prevents destination MAC addresses over-writing source MAC addresses in the lowest cache level. The source MAC addresses are protected from over-write but can be aged out, as described above.

Control tokens in the form of messages containing new source MAC addresses destined for the highest level BFSs 18, and messages containing requests for look-up may interrupt FPDUs in their transit across the network. Refresh requests (which will be described in greater detail below) may also interrupt data packets but are more preferably sent during the idle time of individual BFSLs.

By loading the source MAC address with its ingress port number into the distributed MAC table held at the highest level BFSs, the bridge is learning the routing connection for a destination MAC address of other Ethernet frames received on other ports. Inherent in the network described herein is that the MAC sub-tables will contain different selections of MAC addresses in dependence upon the source MAC addresses of devices attached to individual network ports. For sub-tables which are part of higher levels of BFSs the contents of each sub-table will be a sub-set of all the active MAC addresses, with the combined content of all of the sub-tables of the highest level BFSs comprising the complete set of all active MAC addresses that have not been aged out.

It is usual for cables connecting electronic devices to the network to be moved from one port to another or the network. If this occurs the previously learned route becomes invalid. In a conventional Ethernet Bridge this problem is addressed by aging out MAC table entries that have not been referenced for a period of time. When the cable is moved Ethernet frames with the source address being supplied on the old port would no longer be received. However, other ports receiving Ethernet frames with a destination MAC address matching the moved source would still be routed to the old source port. These frames could not reach the end station addressed by the MAC address. Any end station that erroneously received this frame would be required to discard it. Eventually the MAC table entry would be become aged out and appear invalid. At this point an Ethernet frame received with a destination MAC address that is no longer valid could generate a flood of the Ethernet frame out of all ports of the bridge including the new port location. This would be received by all the end stations including the correct new end station. The wrong end stations would discard the frame and the correct end station would generate a response Ethernet frame using the source MAC address received on the flooded frame. This response frame would be received on the new ingress port and a new MAC table entry could be created for the source MAC address along with the new ingress port address. Subsequent Ethernet frames directed to this end station could now be correctly routed directly to the new port the moved cable had been plugged into. Thus, with a conventional Ethernet Bridge identification of a change in a port connection for a particular electronic device can only be detected through frames addressed to the electronic device being received by the Bridge.

With the Ethernet Bridge described herein the hierarchical caching technique of the MAC address management protocol is capable of responding to changes that might occur in the MAC table entries caused by cables being moved or other Ethernet bridge devices being reconfigured, powered down or powered up. When all the MAC entries of an Ethernet bridge are in a single or central table, as with conventional systems, then changes made to that table are seen by all ports. With MAC table entries distributed over many separate MAC sub-tables located in separate chips, and even separate metal enclosures, then the following mechanism is utilised to cause the changes to propagate across the whole system.

Conventional processor caching mechanisms usually require a fully coherent image of the memory being cached. With the network described herein, however, the caching of MAC entries does not have to be fully coherent to all ports. So-called "lazy" coherency is acceptable where ports eventually see changes made to the MAC tables although no sub-table is likely to ever see all MAC address changes. It is acceptable for propagation of changes to take a few seconds. Even when the Rapid Spanning Tree Protocol (RSTP) is active where changes need to be seen quickly a 2 second update should be fast enough. Under normal operation a 20 second updated would be quite reasonable. Also it is important that MAC table entries that are not being adjusted, because of a simple reconfiguration of cables or other equipment, always remain valid and accessible to route FPDUs across the network to the correct destination.

The coherency in the caching mechanism describe herein is implemented by a refresh process that acts from one level of caching to the next level above. At a relatively low frequency each entry, in turn, within a MAC sub-table on a single BFS 18 is verified by sending a request to fill the entry using the normal routing hash function to the next level above in the hierarchical tree of BFS 18 devices. The entry being refreshed is not invalidated while this request is outstanding. Usually the same MAC table entry value will be returned as was already loaded leaving the state unchanged. However, if at the highest level of BFSs a source MAC entry has changed, or been removed, the new value will be loaded. The new value might be invalid and in this case the entry will be deleted. Every location in a MAC sub-table is refreshed in turn but the rate of refresh can be low and only needs to be comparable to the period of the source aging. This prevents significant network bandwidth being used by the refresh process. As all MAC sub-tables of all the BFSs 18 in the system are performing this operation, the whole state of the distributed MAC table will eventually become completely coherent to any changes made at the top level. As entries are only refreshed their existing values are still available for routing operations without the need to generate any new flood operations.

The scalability of the network described herein is achieved in two ways. Firstly the network effectively increases the size of the MAC table for destination addresses by many orders of magnitude allowing a much smaller, faster and simpler first level MAC table near the network edge to maintain very low latencies. If the individual MAC sub-tables of the network each have 32,000 entries then a 50,000 port switch would have approximately 50 million MAC table entries available to all ports. Secondly, as mentioned earlier the network appears as a single entity which means that only one conversation between two end points needs to take place to make the MAC addresses of these end points available to all the other endpoints in the network. In comparison to a conventional Ethernet Bridge, far less flooding of frames across the network is required to acquire MAC address entries for all active MAC addresses.

The Ethernet bridge or router described herein is truly scalable offering from 256 ports or fewer up to 48,000 ports or more. A single Ethernet bridge or router using the method described herein is capable of providing greatly increased connectivity in comparison to conventional Ethernet bridges. For example, currently the largest 10 Gbe Ethernet bridges (which are modular in construction) offer only 288 ports. With the Ethernet bridge of the present invention, which is capable of operating at 10 Gbe or above, a single bridge is capable of offering 48,000 ports.

It is to be understood that various modifications to the preferred embodiment and the generic principles and features described herein will be readily apparent to those skilled in the art. Thus, the present invention is not intended to be limited to the embodiment shown and such modifications and variations also fall within the spirit and scope of the appended claims.

The invention claimed is:

1. A multi-path network for use in a bridge, switch, router, hub or the like, comprising a plurality of network ports adapted for connection with one or more devices, each device having a different identifying address; a plurality of network elements; and a plurality of network links interconnecting the network elements and connecting the network elements to the network ports, wherein the multi-path network further comprises separately addressable memory elements each adapted for storing identifying addresses and wherein the multi-path network is adapted to generate a corresponding hash value for each such identifying address, and to distribute a plurality of identifying addresses amongst the plurality of memory elements for storage thereby, at respective locations determined by the corresponding hash values for the identifying address concerned, wherein the memory elements are organized hierarchically in at least two levels with a plurality of separately addressable memory elements at each hierarchical level and the multi-path network is adapted to distribute a plurality of identifying addresses amongst a plurality of memory elements in an uppermost hierarchical level.

2. The multi-path network of claim 1, wherein the network is adapted to store the addresses of all devices connected to the network in the memory elements of the uppermost hierarchical level.

3. The multi-path network of claim 1, wherein the network is adapted to store the address for a device at one or more but not all memory elements in an uppermost hierarchical level.

4. The multi-path network of claim 3, wherein the network is adapted to store the address for a device at only one memory element in an uppermost hierarchical level.

5. The multi-path network of claim 1, wherein the storage capacity of an individual memory element is less than the quantity of identifying address data to be stored.

6. The multi-path network of claim 1, wherein each one of the memory elements forms part of a corresponding network element.

7. The multi-path network of claim 1, wherein the network is adapted to refresh the contents of the memory elements in the uppermost hierarchical level with identifying address taken from a data packet received at a network port.

8. The multi-path network of claim 7, wherein each one of the network elements of at least the lowermost hierarchical level includes an additional memory element containing an array of single bits accessed using a hash value generated from the identifying address.

9. The multi-path network of claim 8, wherein the network is adapted to not refresh the contents of the memory elements in the uppermost hierarchical level with the identifying address taken from a data packet received at a network port when the accessed bit in the single bit array corresponding to the source the identifying address of the data packet is set.

10. The multi-path network of claim 9, wherein the network is adapted to update at least one memory element in the uppermost hierarchical level with a new the identifying address when a data packet with the new the identifying address is received at a network port for transmission across the network and the accessed bit for the new the identifying address in the single bit array associated with the network port is clear.

11. The multi-path network of claim 10, wherein the network is adapted to set the accessed bit with the new the identifying address in the single bit array when an update for a memory element in the uppermost hierarchical level is generated.

12. The multi-path network of claim 8, wherein the network elements are adapted to clear the bits of the single bit array at predetermined time intervals.

13. The multi-path network of claim 12, wherein the network is adapted to change at predetermined time intervals the hash function used to generate hash values from the identifying address.

14. The multi-path network of claim 1, wherein the network is adapted to read the identifying address of a data packet received at a network port only once during transmission of the data packet across the network.

15. The multi-path network of claim 1, wherein the network is adapted to communicate the identifying address between hierarchical levels.

16. The multi-path network of claim 1, wherein the network is adapted to convert destination the identifying address to egress network port descriptors and wherein the network is adapted to utilize the egress network port descriptors in routing data packets across the network.

17. The multi-path network of claim 1, wherein the network elements are adapted to clear the identifying address from their respective memory elements after a predetermined time interval.

18. The multi-path network of claim 17, wherein the network elements are adapted to extend the predetermined time interval before the identifying address is cleared if the identifying address is present in any memory element at a higher hierarchical level.

19. The multi-path network of claim 17, wherein the network elements are adapted to extend the predetermined time interval before the identifying address is cleared if the identifying address is observed to exist for one or more devices connected to the network port of the network element at the lowermost hierarchical level.

20. The multi-path network of claim 1, wherein the network elements are adapted to clear the identifying address from their respective memory elements when the identifying address is not present in any memory element at a higher hierarchical level.

21. The multi-path network of claim 1, wherein the memory elements at the lowermost hierarchical level are adapted to indicate the presence or absence of address data in memory elements at the uppermost hierarchical level.

22. The multi-path network of claim 1, wherein the identifying address is a Media Access Control address or IP address.

23. An Ethernet bridge or router including a multi-path network according to claim 1.

24. A method of device address data management in a multi-path network comprising a plurality of network ports adapted for connection with one or more devices, each device having a different identifying address data; a plurality of network elements; a plurality of network links interconnecting the network elements and connecting the network elements to the network ports; and a plurality of memory elements adapted to store identifying addresses, the method comprising generating a corresponding hash value for each such identifying address, and distributing a plurality of identifying addresses amongst the plurality of memory elements for storage thereby at respective locations determined by the corresponding hash values for the identifying address concerned, and organizing the memory elements hierarchically in at least two levels with a plurality of separately addressable memory elements at each hierarchical level and distributing the identifying address across the plurality of memory elements in an uppermost hierarchical level.

25. The method of claim 24, wherein the identifying address for all devices connected to the network is stored in the memory elements of the uppermost hierarchical level.

26. The method of claim 24, wherein the identifying address for a particular device is stored in one or more but not all memory elements in an uppermost hierarchical level.

27. The method of claim 24, wherein the identifying address for a particular device is stored in only one memory element in an uppermost hierarchical level.

28. The method of claim 24, wherein each one of the memory elements forms part of a corresponding network element.

29. The method of claim 28, wherein at least each one of the memory elements at the lowermost hierarchical level includes an array of single bits accessed using a hash value generated from the identifying address.

30. The method of claim 29, wherein at least one memory element in the uppermost hierarchical level is updated on the basis of a new identifying address when a data packet with the new identifying address is received at a network port for transmission across the network and the accessed bit for the new identifying address in the single bit array associated with the network port is clear.

31. The method of claim 30, wherein an accessed bit in the single bit array is set with the new identifying address when an update for a memory element in the uppermost hierarchical level is generated.

32. The method of claim 29, wherein the bits of the single bit arrays are cleared at predetermined time intervals.

33. The method of claim 24, wherein one or more hash values are generated based on said identifying address.

34. The method of claim 33, wherein the hash function used to generate hash values from the identifying address is changed at predetermined intervals.

35. The method of claim 33, wherein identifying address hash values are communicated between hierarchical levels.

36. The method of claim 24, wherein the contents of the memory elements in the uppermost hierarchical level are refreshed on the basis of identifying address taken from data packets received at a network port.

37. The method of claim 36, wherein the contents of the memory elements in the uppermost hierarchical level are not refreshed when a data packet is received at a network port for transmission across the network and the accessed bit in the single bit array associated with the network port is set.

38. The method of claim 24, wherein the identifying address of a data packet received at a network port is read only once during transmission of the data packet across the network.

39. The method of claim 24, wherein destination identifying address is converted to egress network port descriptors and wherein data packets are routed across the network on the basis of the egress port descriptors.

40. The method of claim 24, wherein identifying address is cleared from their memory elements after a predetermined time interval.

41. The method of claim 40, wherein the predetermined time interval before the identifying address is cleared is extended if the identifying address is present in any memory element at a higher hierarchical level.

42. The method of claim 40, wherein the predetermined time interval before the identifying address is cleared is extended if the identifying address is observed to exist for one or more devices connected to the network port of the network element at the lowermost hierarchical level.

43. The method of claim 24, wherein identifying address is cleared from memory elements when the identifying address is not present in any memory element at a higher hierarchical level.

44. The method of claim 24, wherein the memory elements at the lowermost hierarchical level indicate the presence or absence of identifying address in memory elements at the uppermost hierarchical level.

45. The method of claim 24, wherein the identifying address is a Media Access Control address or IP address.

46. The method of claim 24, wherein at least some of the plurality of memory elements are address caches and the method comprises a refreshing step of validating in turn each entry in an address cache by inspecting the contents of a higher level address cache in order to maintain coherency between the address caches.

* * * * *

UNITED STATES PATENT AND TRADEMARK OFFICE
CERTIFICATE OF CORRECTION

PATENT NO. : 8,898,431 B2  
APPLICATION NO. : 13/055408  
DATED : November 25, 2014  
INVENTOR(S) : David Charles Hewson et al.

Page 1 of 1

It is certified that error appears in the above-identified patent and that said Letters Patent is hereby corrected as shown below:

On title page, item (73)

Assignee "Cray HK Limited" should read -- Cray UK Limited --.

Signed and Sealed this
Twenty-eighth Day of April, 2015

Michelle K. Lee
*Director of the United States Patent and Trademark Office*